(12) United States Patent
Long

(10) Patent No.: US 6,289,846 B1
(45) Date of Patent: Sep. 18, 2001

(54) DEVICE FOR ADMINISTERING AND/OR PRESERVING ANIMAL FOOD

(75) Inventor: Alan Long, Leek (GB)

(73) Assignee: Effem GmbH, Verden (DE)

( * ) Notice: Subject to any disclaimer, the term of this patent is extended or adjusted under 35 U.S.C. 154(b) by 0 days.

(21) Appl. No.: 09/077,978

(22) PCT Filed: Oct. 25, 1996

(86) PCT No.: PCT/DE96/02055

§ 371 Date: Aug. 2, 1999

§ 102(e) Date: Aug. 2, 1999

(87) PCT Pub. No.: WO97/21341

PCT Pub. Date: Jun. 19, 1997

(30) Foreign Application Priority Data

Dec. 12, 1995 (DE) .......................................... 295 19 685 U

(51) Int. Cl.[7] .................................................. A01K 29/00
(52) U.S. Cl. .......................................... 119/51.03; 119/710
(58) Field of Search ................................ 119/51.03, 709, 119/710, 711; 426/138, 143

(56) References Cited

U.S. PATENT DOCUMENTS

| | | | |
|---|---|---|---|
| 4,557,219 | * 12/1985 | Edwards | 119/710 |
| 4,808,422 | * 2/1989 | Ward et al. | 426/143 |
| 5,419,283 | * 5/1995 | Leo | 119/709 |
| 5,819,690 | * 10/1998 | Brown | 119/710 |
| 5,832,877 | * 11/1998 | Markham | 119/710 |
| 5,895,662 | * 4/1999 | Meyer | 426/143 |
| 5,912,285 | * 6/1999 | Godsey | 119/709 |
| 5,925,391 | * 7/1999 | Whetston, Jr. | 426/138 |
| 5,947,061 | * 9/1999 | Markham et al. | 119/710 |

* cited by examiner

Primary Examiner—Peter M. Poon
Assistant Examiner—Elizabeth Shaw
(74) Attorney, Agent, or Firm—Dorsey & Whitney LLP

(57) ABSTRACT

Device for dispensing and/or storing animal food, consisting of at least two parts to be detachably connected to each other, at least one part having a recess so that the parts in assembled condition define a cavity located within, serving to accommodate animal food, and in that the parts to be detachably connected to each other are loosed under the influence of biting and/or chewing movements and/or manipulations of the device with the extremities and/or aids by the animal to be fed, thus enabling access to the animal food to be found in the interior of the device.

24 Claims, 2 Drawing Sheets

_US 6,289,846 B1_

DEVICE FOR ADMINISTERING AND/OR PRESERVING ANIMAL FOOD

BACKGROUND OF THE INVENTION

The invention relates to a device for dispensing and/or storing animal food.

In nature, a great many examples of symbiosis of different forms of organisms to their mutual benefit are to be found. Specifically, the evolution of man, and of human societies, is characterized, perhaps indeed dominated, by such symbiotic relationships. The very early hunter-and-gatherer societies must have profited by the indirect or direct proximity of canids. This proximity ultimately led to domestication, which became especially prevalent at the transition from hunter and gatherer to agricultural societies. With advancing differentiation of this reciprocal relationship between (domestic) animal and man, came a more extensive division of labor, which likewise imposed a duty of support on man vis-à-vis beast.

In recent decades, especially in the western industrialized countries, the relationship of man to his domestic animals has once more changed fundamentally. It is only quite rarely that domestic animals today are assigned tasks arising from their special nature or their original importance to man. This applies especially to dogs and cats. Instead, they have become members of the family, and playmates and companions rather than hunting assistants, guards or pest control agents.

Consequently, in the first place the requirements on animal feeding as such by the animal with respect to quantity and quality have changed, and secondly so have the requirements on the part of the owner of the animal. Central to all these considerations is man's duty to support the animals living in his community and the provision of appropriate living conditions.

In efforts to secure appropriate nourishment, heretofore essentially the quality of animal food has been in the foreground. Less attention has been paid to the shape or form in which animal food is dispensed, especially as regards the domesticated predators, the dog and cat.

For the feeding of dogs and cats, typically a dish, in the broadest sense, is employed, in which the food in question is placed. This food may be of highly various consistency, an effort being made to simulate the consistency of the food normally taken by the animals.

However, it cannot have escaped the expert animal harborer's notice that the dispensing of animal food in such form that the animal takes the food offered directly, i.e. from the dish, by no means does justice to the complex behavior involved in foraging for and ingesting food under natural conditions.

Not to enlarge here on the various models that have been developed in the literature to describe the behavior of animals, the principle of double quantification seems plausible for the description and perhaps even the understanding of animal behavior, in order to draw the appropriate conclusions as to the dispensing of animal food in particular.

The principle of double quantification states essentially that the execution of behavior patterns is dependent both on internal conditions, for example in the form of a preparedness to act, and also on external factors, i.e. stimuli, in the sense of triggers. When both factors are present, the behavior pattern in question can be observed. At the same time it is possible that for example in the presence of a strong internal condition, for example such that an action has not been performed over a considerable period of time, comparatively unimportant external factors, i.e. weak triggers, may suffice to cause the behavior pattern in question to be performed.

Applied to the food dish, this means that with the immediate presentation of food in the dish, a long series of behaviors on which the natural procurement of food by the animal is based are not performed. This leads to an intensified preparedness to act, which may then force its way into other modes of behavior, for example overshoot actions, which may ultimately be interpreted as the expression of inappropriate animal husbandry.

Another possibility of breaking down the animal's enhanced preparedness to act consists in that the same is referred to other objects. In the case of dogs, this may for example lead to operations on table legs or the like with the teeth.

To provide a suitable outlet for the modes of behavior described above, attempts have been made to offer food in a suitable form, for example as dog biscuits in the shape of bones. What is accomplished by the visual conformation of a dog biscuit in the shape of a bone is that certain visual stimuli (bone shape) that normally occur in the acquisition of food by the animal are offered under the conditions of domestication as well, and may thus in part satisfy the animal's needs. Other stimulating qualities such as for example tactile stimuli are reflected in the consistency of the bone biscuit. But here again, there is the disadvantage that processing of the food by the animal is very limited. Another disadvantage of such animal feeding, or the shape in which dispensed, may be seen in that not every qualitatively high-grade animal food can be offered in this form. Another point to be considered is that the urge to gnaw, i.e. the internal condition therefor, is very strong in the dog and cat specifically, which would mean that a correspondingly large quantity of such animal food would have to be fed. But this would lead to an imbalance between the animal's urge to chew on the one hand and the necessary supply of nutrition, with the result either that the animal would receive too much food, which is undesirable also from the point of view of proper animal husbandry, or else the gnawing urge would ultimately be unsatisfied.

Satisfaction of the urge to chew on the part of domestic animals, especially dogs, is the purpose of so-called gnawing-bones. A clear internal connection being normally made between chewing and the taking of nourishment, or supply of energy, such gnawing-bones are not in accord with proper animal husbandry, i.e. satisfaction of internal conditions and external practice, which as explained above underlie an acting-out of the corresponding behavior pattern. Although the urge to gnaw is satisfied, more far-reaching stimuli, such as for example tactile stimuli, flavors and odors, and the corresponding physiological reactions, are left out (salivation, production of digestive enzymes and the like). The close temporal correlation of such stimulus configurations as they occur in nature is absent. The corresponding situation therefore cannot be considered species-specific.

SUMMARY AND OBJECTS OF THE INVENTION

The object of the invention is to provide a device serving for the dispensing and/or containment of animal food, where satisfaction of numerous behavior patterns connected with the acquisition of nourishment is at issue. Specifically, in agreement with the temporal correlation of visual, tactile, olfactory and taste stimuli as naturally observed in the taking of food, these are to be simulated to a large extent in the dispensing of animal food, thus upon the whole making possible a more species-specific animal husbandry.

According to the invention, this object is accomplished by a device for dispensing and/ or storing animal food, characterized in that the device consists of at least two parts to be detachably connected with each other, at least one part having a recess, so that the parts in assembled condition define an interior cavity serving for the containment and storage of animal food, and the parts to be detachably connected to each other are released by the animal to be fed, under the influence of biting and/or chewing movements and/or manipulations with the extremities or other aids, thereby enabling access to the animal food to be found in the interior of the device.

In one embodiment, the parts are connected to each other by at least one molded-on plug connection.

In a preferred alternative, the device is of elongated shape with a constriction in at least one location of the device, enabling the device, lying on a surface, to be picked up with the mouth by the animal to which the food is to be dispensed.

In an especially preferred embodiment, the device may be formed in the shape of a bone.

In one embodiment, the device features a surface depression serving as point of attack for opening the device to render accessible the food accommodated therein.

In an alternative, a crevice is formed on the device by the assembling of the parts, to serve as point of attack for opening the device and thereby rendering accessible the animal food contained within it; in an especially preferred embodiment, the crevice runs in lengthwise direction of the device.

Quite especially advantageous is an embodiment in which the crevice differs in width along its length.

A preferred embodiment is achieved in that the cavity formed inside the device by the assembling of the parts is larger than required to accommodate the animal food, and the animal food introduced can move relative to itself and to the hollow interior.

In an especially preferred embodiment of the device according to the invention, the cavity, or a portion thereof, is sealed with an edible biopolymer or synthetic material.

In a preferred embodiment, the seal of the hollow cavity is broken by the action of enzyme activity contained in the saliva of the animal to be fed.

In an alternative, at least a portion of the device is made of edible material.

An especially preferred alternative of the present invention is achieved by making all parts of the device out of edible material.

In one embodiment, at least a portion of the device is treated with scents and/or flavorings.

In an especially preferred embodiment, the flavorings and/or scents are released only under the influence of enzymatic activity contained in the saliva of the animal to be fed.

In an alternative, the device comprises means representing pronounced tactile stimuli for the animal to be fed, and in especially preferred embodiments the said means are selected from the group comprising fiber elements and rough surface elements among other spatial structures.

In one embodiment, the device according to the invention comprises design means that represent pronounced visual triggers of modes of behavior connected with the taking of nourishment by the animal to be fed.

An especially preferred embodiment results if said design means are selected from the group comprising color patterns, color intensities and colors, or their corresponding grays, among other spatial elements.

In an alternative, the device, after assembly of the at least two parts of which it is composed, comprises a coating that is dissolved under the action of enzymatic activity contained in the saliva of the animal to be fed, and releases the animal food to be found in the interior of the cavity only after dissolution of the said coating, possibly under the influence of biting and/or chewing movements and/or manipulations of the device with the extremities and/or other aids by the animal to be fed.

A preferred embodiment results if the coating extends to the area of the joint between the partsmaking up the device and releases the animal food contained inside the cavity only after dissolving of the said coating.

A quite especially preferred embodiment results in that the coating extends to the region of the crevice between the parts making up the device and releases the animal's food contained in the cavity of the device under the influence of biting and/or chewing movements and/or manipulation of the device with the extremities and/or other aids by the animal to be fed only after dissolving of the said coating.

In a preferred alternative, the coating contains scents and/or flavorings.

In an especially preferred embodiment, the flavorings and/or scents are released only under the influence of enzymatic activity contained in the saliva of the animal to be fed.

The invention relates further to use of the device for storing and/or dispensing animal food for the purpose of storing and/or dispensing animal food.

By the device according to the invention, the animal keeper is enabled to store animal food and above all to dispense it to the animal in a species-specific manner. By species-specific is meant that the animal is confronted with as many as possible of those stimulus configurations with which it would be confronted in the species-specific acquisition of food, and consequently will develop all those behavior patterns, or at least as many of them as possible. The device according to the present invention thereby overcomes all the disadvantages of the prior art as described above. In accordance with the principle of double quantification, this is attended by a reduction of preparedness to act for many behavior patterns necessary in the course of the procurement and ingestion of foods. In that the actual nourishment is contained in a cavity located in the interior of the device, the animal must perform an entire series of manipulations in order to loose the parts detachably connected or to be connected to each other under the influence of biting and/or chewing movements and/or manipulations of the device with the extremities and/or other aids by the animal to be fed, thereby enabling access to the animal food to be found inside the device. Instead of lying there exposed as is the case when a feeding dish is used, certain warrantable efforts on the part of the animal are required for the enjoyment of the food. The stimuli triggering these behavior patterns are part of an otherwise comparatively stimulus-poor environment under the normally prevailing conditions of harboring in this respect. In that the device according to the invention consists of at least two parts detachably connected to each other, the animal can itself open up its source of food. Not only that the actual purpose of feeding, the supply of nutrition, is accomplished; at the same time a reward is given for the efforts made and the relevant preparedness for action is resolved.

From what has been said, an additional advantage emerges, such that the said device according to the invention serves not only for the dispensing and/or keeping of animal food, but may also be seen as a toy or means of animal education, the animal food contained in the device serving as positive reinforcement of desired modes of behavior.

In that the parts of the device according to the invention are connected to each other by at least one molded-on plug connection, there is a simple but highly effective possibility of regulating the conditions under which the device will be opened by the animal to be fed. A close fit between the molded plug connections will add difficulty to the opening of the device, so that even for example dogs of greater size must exert an expenditure of effort appropriate to their bodily strength in order to reach the animal food contained in the device. Conversely, a comparatively loose plug connection can enable even smaller dogs to open the device. The opening may take place under the influence of biting and/or chewing movements and/or manipulations of the device with the extremities and/or aids by the animal to be fed. Another advantage of such a molded plug connection consists in that the Darts making up the device are so firmly connected to each other that they will not immediately release their contents in response to a mere picking up of the device according to the invention by the animal to be fed or by a probing with the extremities.

In that the device according to the invention comprises a constriction in at least one location, it is assured that the animal is able to grasp the device with the jaws in order to pick it up, as is possible in play or training or in the acting out of natural behavior patterns (retrieving the prey). By suitable design, it is also possible that dogs differing in both size and shape of the muzzle can use one and the same bone.

The possibility of picking up the said device according to the invention with the mouth of a dog for example is also accommodated by the elongated shape of the device. Furthermore, the playful factor that may accompany the use of the said device may take its place alongside the aspect of presentation of behavior-relevant visual triggers. Applied to the present case, this means that in the context of species-specific animal husbandry, the configuration of the total life situation, for example by presentation of suitable visual stimuli, should be brought as close as possible to the conditions that would be found in the natural environment. The elongated shape presents a visual stimulus closely approaching conditions in nature, whence, in accordance with the principle of double quantification, a reduction of readiness to act out the corresponding behavior patterns results, just as would be the case upon/after ingestion of the food under natural conditions. In that the said device is formed in the shape of a bone, special account is taken of the relevant need of the animal, specifically the dog.

In that the device according to the invention is provided with a surface depression, in particular a crevice, serving as point of attack for opening the device and thereby rendering acceptable the animal food accommodated in the interior, whether said surface depression is formed by the assembling of the parts or not, other advantages are realized respecting the lowering of readiness to act as described above in the sense of species-specific animal feeding and hence husbandry. The crevice enables the animal being fed to open the device with the teeth. In combination with the elongated shape, moreover, other motor activities, such as for example the employment of the extremities, are promoted. All this is a clear extension of the normal course of action when the animals are fed for example with use of a dish. This is supported by the extension of the crevice in lengthwise direction of the device.

Special manufacturing advantages result from the fact that the surface depression (crevice) results from the assembly of the parts of the device.

In that the crevice is of varying width along its length, animals with jaws of different size are given different points of attack, so that one and the same size of device may be used for example for different breeds of dog. Besides, the difference in width also opens up the possibility that different teeth (incisors, canines, molars) can be used to open the device and thus get at the food.

That the cavity inside of the device is larger than necessary to actually accommodate the animal food, especially when the animal food to be taken consists of a number of solid parts with a hard surface, makes possible a relative motion of the animal food in relation to itself and the interior of the cavity. This relative motion necessarily generates noise, representing an additional stimulus of positive value in connection with the taking of food. Another related advantage is that, since the food is able to move within the cavity, a displacement of the center of gravity is brought about. This shift in center of gravity is noticeable by the animal when it moves or carries the device in question. Additional tactile stimuli then occur, that are not achieved by any of the devices described in the prior art.

With the device according to the invention, there is the further advantageous possibility, in addition to the actual animal food stored in the hollow interior itself, of supplying the animal with an additional source of nourishment in the form of the actual device. This is achieved in that at least a part, or the device as a whole, is made of an edible biopolymer or synthetic material.

Besides the dispensing of solid animal food, the device according to the invention also permits the dispensing of liquid or viscous animal food, in that the cavity or a portion of it is sealed with an edible biopolymer or synthetic material. This ensures that upon handling of the device, whether by the animal keeper or by the animal itself, the animal food in question will not be released prematurely. If the sealing of the cavity employs an edible biopolymer, or an equivalent synthetic, that will be dissolved under the influence of enzymatic activity contained in the saliva of the animal to be fed, it can be ensured that even after opening of the device, the food will not be released at once, but further "efforts" on the part of the animal to be fed are required, such as for example licking, before the food actually becomes accessible as such.

If at least a part of the device is furnished with scents and/or flavorings, the advantage is gained that the device, and hence ultimately the process of feeding itself, is made more interesting for the animal, since the senses of taste and smell can be further targeted by this measure, signifying a further approach to the conditions of taking nourishment in the wild state. Furthermore, such a design is of advantage especially when the animal is to be medicated, which would otherwise be difficult to do orally.

Finally, other advantages result from the fact that the device comprises means representing marked tactile stimuli for the animal to be fed. Such means may among other things comprise spatial structures, fibrous elements and rough surface elements. This leads to a still more far-reaching imitation of the stimuli associated with the taking of nourishment, whereby the number of senses involved in the eating process enhances the experiential value to the animal and hence its over-all condition.

Other advantages in this respect result from the fact that the device comprises design features representing visual triggers of modes of behavior related to the taking of nourishment for the animal to be fed, such design elements comprising among others spatial elements, colors, color patterns, color intensities and hues and/or their corresponding grays.

In that the device comprises a coating dissolved under the action of enzymatic activity contained in the saliva of the animal to be fed, a number of other advantages arise, ultimately related to the fact that various qualities of stimulus in the process of eating are specially emphasized in comparison with ordinary eating from a feeding dish. If a coating extends only over the area of the joint between the parts that make up the device, the animal to be fed has the opportunity to work on the device with jaws and/or extremities without immediately releasing the food contained in the device under the influence of this measure. Instead, the coating according to the invention can assure that only after a certain length of time, namely when the coating has been dissolved under the influence of enzymatic activity contained in the saliva of the animal to be fed, will the food contained in the device be released. This prevents the animals from being able to open the device by the mere use of the teeth.

Although experience shows that the ability to open the device according to the invention with the teeth is acquired in a very short time by the animals, compared to conventional systems there are still considerable advantages with respect to diminution of readiness to act, even if the device according to the invention does not comprise the said coating.

A more far-reaching possibility results in that the coating itself contains scents and/or flavorings of a kind not only to arouse the animal's interest but also to guide it in certain directions, for example through realization of an appropriate spatial or temporal gradient. In order not to raise the stimulus threshold in question too early, advantageously the release of the flavorings and/or scents may be triggered only under the influence of enzymatic activity contained in the saliva of the animal to be fed, thereby conditioning a more complex course of action in the process of feeding.

Over all, the device according to the invention is eminently suited to simulate the various combinations of stimuli in the feeding of the animal as they would occur under natural conditions. And on the basis of the contemporary understanding of animal behavior, this leads to a generally more species-specific keeping of animals, in particular dogs and cats.

Besides, the use of the said device according to the invention for storing and/or dispensing animal foods has positive repercussions on the use of animal senses, which therefore run no risk of degenerating, as may otherwise be the case when particular sense impressions fail to be received over a long period of time. Furthermore, use of the device leads to exercising the animal's entire neuromuscular apparatus. Here it is especially important to note that use of the neuromuscular units specially addressed is not realized under the conditions of animal husbandry as practiced in most cases. Thus the use according to the invention of the device according to the invention helps keep animals in physical health in the broadest sense of the term.

BRIEF DECRIPTION OF THE DRAWING

For further illustration of the invention, an embodiment of the device according to the invention will be explained in the following. In the drawing, FIG. 1 shows a side view of the device according to the invention;

DESCRIPTION OF THE PREFERRED EMBODIMENT

Figure 1:
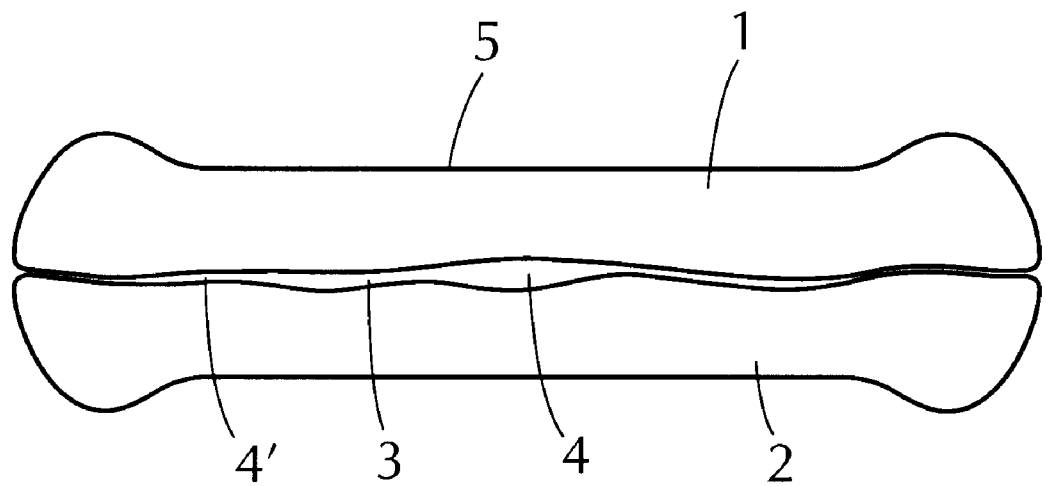

FIG. 1 shows a side view of the device according to the invention, the device consisting in the present case of two parts, a top 1 and a bottom 2. The device is in the shape of a bone, and so permits grasping of the device by the jaws of a dog for example. The top 1 and bottom 2 are detachably connected to each other and form a crevice 3 in lengthwise direction, having different widths 4 and 4' at different points.

Figure 2:
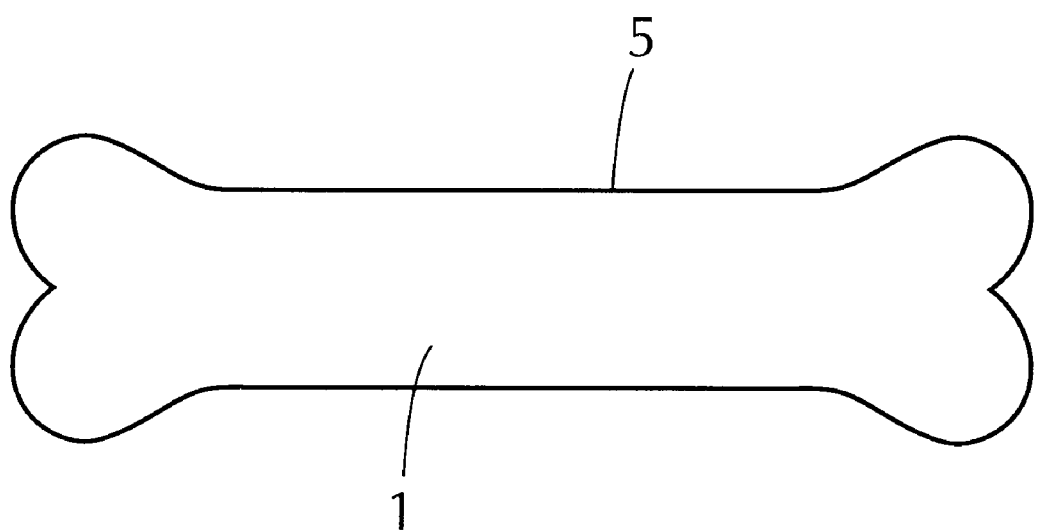
FIG. 2 shows a top view of the device according to the invention.

FIG. 2 shows a top view of the device according to the invention, the top 1 and bottom 2 being of practically the same shape in this case, so that only the top 1 is seen in the top view. A constriction 5 is indicated so that the device can be picked up and perhaps carried by the animal to be fed, or picked up in play from the floor and other surfaces or for training purposes.

Figure 3:
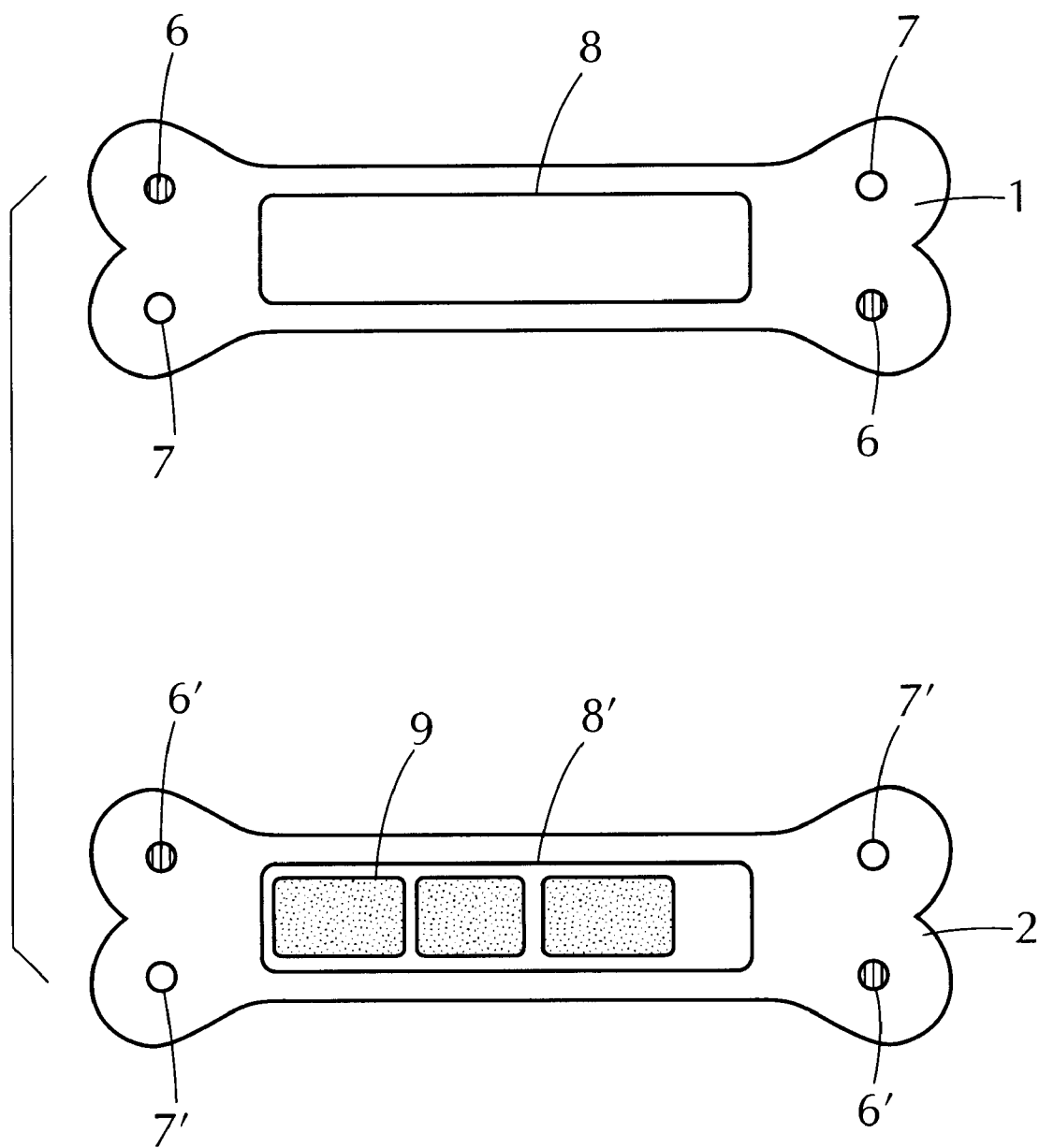
FIG. 3 shows a top view of the opened device according to the invention.

FIG. 3 shows a top view of the opened device according to the invention, both the top 1 and the bottom 2 being provided with means permitting a releasable plug connection of the two parts. The pegs 6 of the top 1, upon assembly of top 1 and bottom 2, are introduced into the holes 7' of the bottom 2 and the pegs 6' of the bottom 2 into the holes 7 of the top 1. The fit of the plug connection determines essentially under what application of force the top 1 and bottom 2 can be detached from each other to release the animal food 9 accommodated in the recess 8 and 8'. When the top 1 and bottom 2 are assembled according to the invention, the two recesses 8 and 8' of top 1 and bottom 2 form the inner cavity containing the animal food in the device according to the invention.

Alternatively, the top 1 and bottom 2 can be sealed together with or without pegs 6 and 6' by a seal at the joint or a complete coating of an edible biopolymer or synthetic material which releases top 1 and bottom 2 upon enzymatic activity contained in an animal's saliva. The device itself and the biopolymer or synthetic material can also be coated with scents and/or flavorings which may also be released under the influence of enzymatic activity from the saliva of the animal.

The features of the invention as disclosed in the foregoing description and in the claims may be essential either singly or in any combination to the realization of the invention in its various embodiments.

I claim:

1. A device for dispensing animal food stored within the device comprising at least two parts releasably connected together, at least one of said parts having a recessed portion therein so that when the parts are assembled together an internal cavity is defined to accomodate animal food therein, said at least two parts being assembled together to maintain a lengthwise open crevice there between which serves as a point of attack for an animal to separate the at least two parts to gain access to the food therein by bitting or chewing or manipulating the device with the extremities of the animal to be fed.

2. The device according to claim 1, wherein the releasable connection holding the parts to each other comprises at least one molded-on plug connection.

3. The device according to claim 1, wherein the device has an elongated shape and comprises a constriction in at least one location on the device, enabling the device when lying on a surface to-be picked up with the jaws by the animal to which the food is to be dispensed.

4. The device according to claim 3, wherein the device is shaped in the form of a bone.

5. The device according to claim 1, wherein the device comprises a surface depression serving as point of attack for opening the device and rendering accessible the animal food accommodated in the interior.

6. The device according to claim 1, wherein said crevice formed on the device is dimensioned so it can serve as a point of attack for opening the device and rendering accessible the animal food disposed in the interior.

7. The device according to claim 1, wherein said crevice has varied widths along its length.

8. The device according to claim 1, wherein the cavity formed in the interior of the device by the assembly of the parts is larger than necessary to accommodate the animal food so that the animal food put in can move relative to itself and the hollow interior.

9. The device according to claim 1, wherein at least part of the device is made of edible material.

10. The device according to claim 1, wherein all parts of the device are made of edible material.

11. The device according to claim 1, wherein at least part of the device is furnished with scents and/or flavorings.

12. The device according to claim 11, wherein the flavorings and/or scents are released only under the influence of enzymatic activity contained in the saliva of the animal to be fed.

13. The device according to claim 1, wherein the device includes means for providing pronounced tactile stimuli for the animal to be fed.

14. The device according to claim 13, wherein said means for providing tactile stimuli are selected from the group consisting of spatial structures, fiber elements and rough surface elements.

15. The device according to claim 1, wherein the device includes means representing pronounced triggers of modes of behavior related to the taking of nourishment for the animal to be fed.

16. The device according to claim 15, wherein said emans representing triggers of modes of behavior are selected from the group consisting of spatial elements, color patterns, color intensities, colors and/or their corresponding grays.

17. The device according to claim 1, wherein the cavity is sealed with an edible biopolymer or synthetic material.

18. The device according to claim 1, wherein a part of the cavity is sealed with an edible biopolymer or synthetic material.

19. The device according to claim 17 or 18, wherein the edible biopolymer or synthetic material is dissolved under the influence of enzymatic activity contained in the saliva of the animal to be fed.

20. The device according to claim 1, wherein after assembly of the at least two parts of which it is composed, a coating is provided which dissolves under the action of enzymatic activity contained in the saliva of the animal to be fed.

21. The device according to claim 20, wherein the coating extends to the area of the joint between the parts of which the device is composed, and releases the animal food contained in the interior of the cavity of the device only after dissolving of the said coating.

22. The device according to claim 20, wherein the coating extends to the area of the joint between the parts of which the device is composed, and releases the animal food contained in the cavity of the device only when the said coating has dissolved under the influence of biting and/or chewing movement and/or manipulations of the device with the extremities and/or aids of the animal to be fed.

23. The device according to claims 20, 21, or 22, wherein scents and/or flavorings are contained in the coating.

24. The device according to claims 20, 21, or 22, wherein scents and/or flavoring are contained in the coating and the flavorings and/or scents are released only under the influence of enzymatic activity contained in the saliva of the animal to be fed.

* * * * *